United States Patent [19]

Adams

[11] Patent Number: 4,633,907
[45] Date of Patent: Jan. 6, 1987

[54] VALVE ASSEMBLIES

[75] Inventor: Frederick J. Adams, Clevedon, England

[73] Assignee: TRW Cam Gears Limited, Clevedon, England

[21] Appl. No.: 665,643

[22] Filed: Oct. 29, 1984

[30] Foreign Application Priority Data

Nov. 18, 1983 [GB] United Kingdom ............... 8330877

[51] Int. Cl.$^4$ .................... F16K 11/12; F16J 15/46
[52] U.S. Cl. ........................ 137/625.22; 91/375 A;
 277/3; 277/27; 277/177; 251/900
[58] Field of Search ............ 251/DIG. 1; 277/3, 27, 277/177, 173, 174; 137/625.22, 625.23, 625.24; 91/375 A

[56] References Cited

U.S. PATENT DOCUMENTS 3,887,148 6/1975 McClure et al. ............. 277/177 X
4,335,749 6/1982 Walter ......................... 137/625.22

FOREIGN PATENT DOCUMENTS 37554 9/1914 Sweden ............................ 277/174
398220 2/1966 Switzerland ...................... 277/169
2044697 10/1980 United Kingdom .

OTHER PUBLICATIONS

E. I. du Pont de Nemours & Co., "The Journal of Teflon", Sep.–Dec. 1970, back cover.

Primary Examiner—Martin P. Schwadron
Assistant Examiner—John S. Starsiak, Jr.
Attorney, Agent, or Firm—Yount & Tarolli

[57] ABSTRACT

In a sealing arrangement for a rotary fluid pressure control valve, such as a power steering control valve, a resilient sealing ring is located in a ring groove for sealing engagement with an outer cylindrical member. Frictional losses and a tendency for the sealing assembly to jam are reduced by equalization of the fluid pressure on opposite faces of the sealing ring. This is achieved by virtue of a tapered ring cross-sectional profile and other ring profiles disclosed herein, or by provision of a relieved zone in the ring groove for transmission of fluid pressure.

7 Claims, 4 Drawing Figures

VALVE ASSEMBLIES

This invention relates to rotary valve assemblies and to associated hydraulic systems. In particular, the invention relates to rotary valve assemblies for power assisted steering gear.

Power assisted steering gear may consist of a source of hydraulic fluid under pressure, a servo motor to be actuated thereby to provide the power assistance, and a hydraulic control valve provided between the hydraulic pressure source and the servo motor to control the operation of the motor in accordance with steering requirements of a vehicle to which the system is fitted.

In such steering gear the problem arises that the relatively high hydraulic pressure required to operate the servo motor is, throughout the operating period, continuously applied to the control valve assembly with the result that the seals in the control valve assembly are permanently stressed by the pressure.

We have found that in a rotary valve assembly of the kind used in power assisted steering gear this problem can result in excessive resistance to rotation of the valve assembly parts, and even in the extrusion of the sealing rings provided in the valve assembly into the operating clearance between the rotation parts to be sealed, which tends to further increase that resistance.

It is believed that the problems identified above arise from the very particular operating conditions arising in relation to rotary valve assemblies in power assisted steering gear and that sealing techniques used in technically unrelated hydraulic systems cannot be expected to be directly applicable to rotary valve assemblies.

An object of the present invention is to provide a rotary valve assembly offering improvements in relation to the problems identified above. The invention may also provide, in a hydraulic system, an improved method of sealing one member relative to another.

According to the invention there is provided a rotary valve assembly as defined in the accompanying claims.

In an embodiment described below there is provided a rotary valve assembly in which a sealing ring located in an annular groove formed in one of a pair of members rotatable relative to each other has a cross-sectional shape such that fluid pressure can, on the upstream side of the annular sealing zone of the sealing ring, exert opposing forces on opposite radially or axially facing surfaces of the ring. In one embodiment the ring has a generally wedge shaped profile and tapers in the radially outward direction so that the hydraulic pressure acts on the opposite radially facing surfaces of the ring and the forces arising therefrom are largely counterbalanced.

In another embodiment, the sealing ring has a substantially rectangular profile and the groove for the sealing ring includes a relieved portion whereby fluid pressure is communicated to both axially facing sides of the sealing ring so that the axially directed forces resulting therefrom are largely counterbalanced.

In a conventional sealing ring arrangement comprising a square section ring located, with clearance, in a generally square section ring groove, the fluid pressure forces the ring into one corner of the ring groove so that the ring abuts both members and lies across the working clearance between them and is to some extent extruded into this clearance. In this conventional arrangement, the ring is held by fluid pressure in face-to-face contact over two full surfaces with both of the pair of members.

As a result, the ring effectively jams the two members against relative rotation with the result that the force necessary to effect such relative rotation is very high. In the embodiment described below in which the ring groove includes a relieved portion so that the axial forces acting on the ring largely counterbalance each other, the ring is held by the fluid pressure mainly only against the un-grooved member with result that the other member is comparatively free to rotate. In the embodiment in which the ring tapers in the radially outward direction so that radially-directed forces acting on the ring are largely counterbalanced but axially directed forces acting on it are not, the ring is held by the fluid pressure against one side of its groove, but the un-grooved member is comparatively free to rotate.

Embodiments of the invention will now be described by way of example with reference to the accompanying drawings in which.

This embodiment of the invention is intended for use in relation to a valve assembly for power assisted steering gear.

The valve assembly may comprise a tubular member 12 which is rotatable within and with respect to a valve casing 1. The tubular member 12 carries annular seals whereby the tubular member is sealed to the valve casing with respect to fluid pressure flow in the axial direction.

Figure 1:
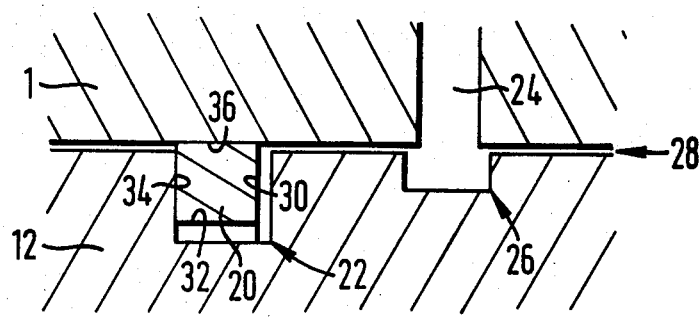
FIG. 1 shows a cross-section through a portion of a valve assembly showing a conventional rectangular section sealing ring.

In FIG. 1 there is shown a conventional sealing arrangement in which a rectangular section sealing ring 20 is located in a corresponding rectangular section groove 22. Fluid pressure is applied to the assembly through an inlet drilling 24 formed in casing 1 and aligned with a communication groove 26.

In use, tubular member 12 is caused to execute angular movement relative to valve casing 1 in accordance with steering operations to open and close the valve assembly which is controlling the supply of hydraulic fluid to a servo motor.

In this embodiment the fluid pressure is communicated from inlet 24 along the cylindrical working clearance 28 between casing 1 and tubular member 12 to groove 22. The fluid pressure acts on the two exposed mutually perpendicular upstream side faces of ring 20—namely side face 30 and inner face 32. As a result, the sealing ring is held with its other two faces 34 and 36 in sealing engagement respectively with the downstream side face of groove 22 and the inner surface of casing 1.

As a result, there is a large area of contact between sealing ring 20 and casing 1 and tubular member 12, whereby the high hydraulic pressure causes substantial resistance to relative motion between the casing and the tubular member and there is also a tendency for the seal to be extruded into the clearance 28.

Figure 2:
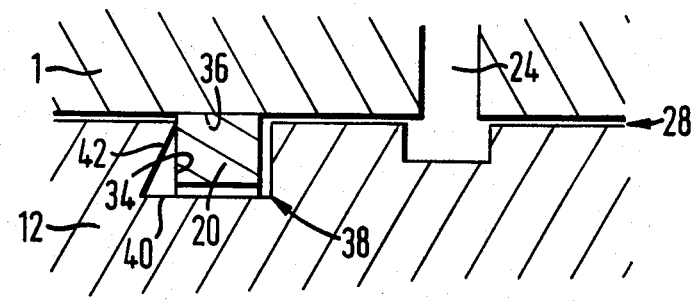
FIG. 2 shows a corresponding cross-sectional view through a valve assembly incorporating a rectangular section sealing ring and a groove for the sealing ring formed with a special profile in accordance with the invention.

In the embodiment of FIG. 2, casing 1 (which constitutes an outer member) and tubular member 12 (constituting an inner member) are arranged as in FIG. 1, but rectanglar section groove 22 has been replaced by a groove 38 having a profile such that a relieved portion 40 is provided whereby fluid pressure entering the groove from inlet 24 is communicated to the opposite axially facing side 34 of sealing ring 20 whereby the axial forces acting on the sealing ring are largely balanced. There is sealing contact between the ring and inner member 12 along an annular sealing zone 42, and also over the full area of outer face 36 of the sealing ring.

As a result of the largely balanced state of the axially directed forces acting on the sealing ring 20, there is a very much reduced tendency for the ring to be extruded into clearance 28 and also significantly reduced friction between the sealing ring and inner member 12.

Figure 3:
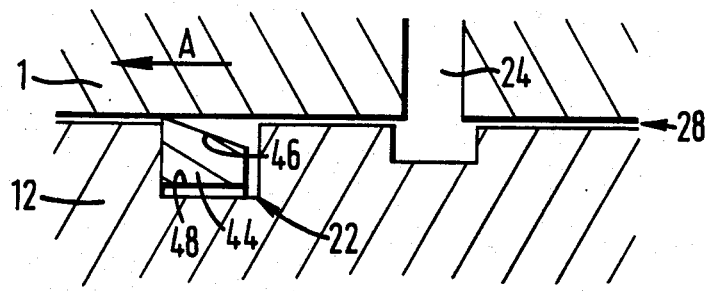
FIG. 3 shows, in a similar cross-sectional view, a further embodiment of the invention in which the groove is of conventional profile and the sealing ring is generally wedge shaped.

In the embodiment of FIG. 3, otherwise constructed as in FIG. 1, there is provided a sealing ring 44 having a generally wedge shaped profile in which its outer surface 46 is inclined with respect to the axial direction A at an appreciable angle of at least two and preferably at least ten degrees, the preferred range being from 20 to 40 degrees, and the sealing surface has a width measured in the axial direction of the ring of one tenth to one half of the axial length of the ring.

In this embodiment, the communication of fluid pressure both to the radially facing outer surface 46 and the inner surface 48 of the sealing ring results in substantially balanced radially-directed forces acting on the sealing ring whereby frictional forces between the ring and outer member 1 are substantially reduced. Moreover, the substantial inclination of outer surface 46 with respect to direction A tends to avoid any substantial extrusion of material of the sealing ring into clearance 28.

Figure 4:
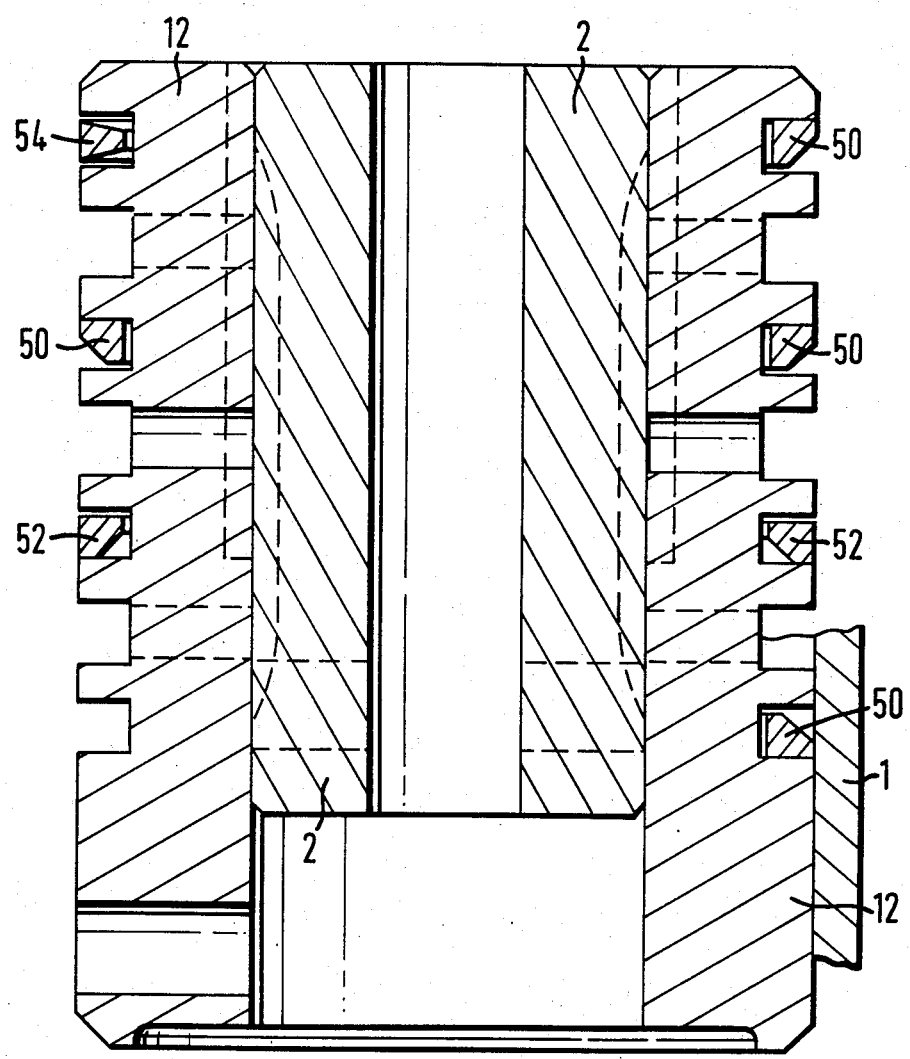
FIG. 4 shows an axial section through a portion of a valve assembly for power assisted steering gear.

FIG. 4 shows the valve casing 1 and inner member 12 with associated valve rotor 2 of a valve assembly of the kind shown in our British patent specification No. 2 044 697 A and includes by way of example, various forms of sealing ring profile which are modifications of the profile of the embodiment of FIG. 3 above.

In FIG. 4, profiles 50 correspond fairly closely with the profile of sealing ring 44 in FIG. 3, but with a wider (measured in the axial direction) outer sealing zone on the sealing ring. Profile 52 corresponds to that of profile 50, but turned inside out so that the full axial width of the sealing ring is in sealing engagement with casing 1 and only a reduced radial width seals against the side face of the groove in tubular member 12. This arrangement largely balances axial forces acting on the sealing ring.

FIG. 4 also shows a further profile 54, similar to that of profile 52 but which is symmetrical and produces a similar result in terms of balanced forces acting on the ring.

I claim:

1. A rotary control valve assembly comprising:
   an outer valve sleeve member defining an inner cylindrical bore;
   an inner valve member received within said inner cylindrical bore of said valve sleeve member for relative rotation therein about a common longitudinal axis of said inner and outer valve members, said outer and inner valve members having valve ports and defining fluid passaeways, said outer and inner valve member effecting fluid flow control by relative rotational movement thereof;
   sealing means for effecting fluid sealing between said inner and outer valve members, said sealing means comprising an annular ring groove formed coaxially with said inner and outer valve members in the surface of one of said inner and outer valve members and a sealing ring received in said annular ring groove for sealingly engaging both said inner and outer valve members;
   said sealing ring having one pair of opposite sides which face radially inwardly and outwardly with respect to said common longitudinal axis, and another pair of opposite sides which face axially with respect to said common longitudinal axis;
   said sealing ring and said annular ring groove therefor being formed with cooperating profiles to define a passageway providing fluid pressure communication between said opposite axially facing sides of the sealing ring, whereby axially directed resultant forces exerted by the fluid pressure on said pair of opposite axially facing sides of said sealing ring substantially offset each other;
   one of said radially facing sides of said sealing ring sealingly engaging a radially facing surface on the other of said inner and outer valve members under the influence of radially directed forces exerted by the fluid pressure on the other of said radially facing sides of said sealing ring so as to be rotationally fixed to said other of said inner and outer valve members;
   said cooperating profiles of said sealing ring and said annular ring groove defining means for effecting sliding rotational sealing engagement between one of said axially facing sides of said sealing ring and an axially facing surface of said annular ring groove, the width of said one axial facing side and said axial facing surface measured in the radial direction being less than the radial thickness of said sealing ring.

2. The valve assembly of claim 1 wherein said sealing ring comprises a natural or synthetic elastomer or other polymeric material.

3. The valve assembly of claim 1 wherein said annular ring groove is formed in the outer surface of said inner valve member.

4. The valve assembly of claim 1 wherein said sealing ring is substantially rectangular in cross-section, and said annular ring groove includes a relieved portion to define with said sealing ring said passage means.

5. The valve assembly of claim 18 wherein said relieved portion has a generally wedge shaped cross-section.

6. The valve assembly of claim 1 wherein said annular ring groove is substantially rectangular in cross-section, and said sealing ring has a cross-section defining with said annular ring groove said passage means.

7. The valve assembly of claim 1 wherein said sealing ring has a cross-section which is generally wedge shaped and tapers in the radially inward direction with respect to said common longitudinal axis of said inner and outer valve members.

* * * * *

UNITED STATES PATENT AND TRADEMARK OFFICE
CERTIFICATE OF CORRECTION

PATENT NO. : 4,633,907
DATED : January 6, 1987
INVENTOR(S) : Frederick J. Adams

It is certified that error appears in the above—identified patent and that said Letters Patent are hereby corrected as shown below:

Column 4, line 53, change "claim 18" to
 -- claim 4 --

Signed and Sealed this

Twenty-first Day of April, 1987

*Attest:*

DONALD J. QUIGG

*Attesting Officer*   *Commissioner of Patents and Trademarks*